United States Patent
Samson et al.

(10) Patent No.: US 10,184,332 B2
(45) Date of Patent: Jan. 22, 2019

(54) WELL TOOLS WITH VIBRATORY TELEMETRY TO OPTICAL LINE THEREIN

(71) Applicant: Halliburton Energy Services, Inc., Houston, TX (US)

(72) Inventors: Etienne M. Samson, Cypress, TX (US); Neal G. Skinner, Lewisville, TX (US); William Mark Richards, Flower Mound, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/107,832

(22) PCT Filed: Mar. 24, 2014

(86) PCT No.: PCT/US2014/031626
§ 371 (c)(1),
(2) Date: Jun. 23, 2016

(87) PCT Pub. No.: WO2015/147791
PCT Pub. Date: Oct. 1, 2015

(65) Prior Publication Data
US 2017/0009572 A1    Jan. 12, 2017

(51) Int. Cl.
*G01V 3/00* (2006.01)
*E21B 47/14* (2006.01)
(Continued)

(52) U.S. Cl.
CPC .............. *E21B 47/14* (2013.01); *E21B 17/00* (2013.01); *E21B 17/026* (2013.01);
(Continued)

(58) Field of Classification Search
None
See application file for complete search history.

(56) References Cited

U.S. PATENT DOCUMENTS

| 5,898,517 A | 4/1999 | Weis |
| 6,913,079 B2 | 7/2005 | Tubel |

(Continued)

FOREIGN PATENT DOCUMENTS

| EP | 2010053931 | 5/2010 |
| EP | 2010136809 | 12/2010 |

(Continued)

OTHER PUBLICATIONS

International Search Report and Written Opinion for International Application No. PCT/US2014/031626 dated Mar. 24, 2014.

(Continued)

*Primary Examiner* — Adolf Dsouza
(74) *Attorney, Agent, or Firm* — John Wustenberg; Tumey L.L.P.

(57) ABSTRACT

A well tool can include an outer housing and a vibratory transmitter disposed in the outer housing. The vibratory transmitter transmits a vibratory signal to an optical line disposed in the outer housing. A well system can include an optical line extending in a wellbore, and at least one well tool secured to the optical line and including a vibratory transmitter which transmits a vibratory signal to the optical line. The optical line conveys the well tool into the wellbore. A method of telemetering data from a well tool to an optical line can include securing the well tool to the optical line without optically connecting the well tool to the optical line, and conveying the well tool in a wellbore on the optical line.

20 Claims, 3 Drawing Sheets

(51) Int. Cl.
*E21B 47/12* (2012.01)
*E21B 17/00* (2006.01)
*E21B 17/02* (2006.01)
*E21B 17/10* (2006.01)
*G01V 11/00* (2006.01)

(52) U.S. Cl.
CPC ........ *E21B 17/1035* (2013.01); *E21B 47/123* (2013.01); *G01V 11/002* (2013.01)

(56) References Cited

U.S. PATENT DOCUMENTS

| | | | |
|---|---|---|---|
| 7,216,737 B2 * | 5/2007 | Sugiyama | G01V 1/523 181/102 |
| 7,946,341 B2 | 5/2011 | Hartog et al. | |
| 8,020,616 B2 | 9/2011 | Greenaway | |
| 8,225,867 B2 | 7/2012 | Hartog et al. | |
| 8,245,780 B2 | 8/2012 | Fidan et al. | |
| 8,315,486 B2 | 11/2012 | Pearce et al. | |
| 8,347,958 B2 | 1/2013 | Hartog et al. | |
| 8,408,064 B2 | 4/2013 | Hartog et al. | |
| 8,520,197 B2 | 8/2013 | Handerek | |
| 8,537,345 B2 | 9/2013 | Crickmore et al. | |
| 8,760,639 B2 | 6/2014 | Handerek | |
| 8,770,283 B2 | 7/2014 | Hartog et al. | |
| 8,924,158 B2 | 12/2014 | Kragh et al. | |
| 8,950,482 B2 | 2/2015 | Hill et al. | |
| 8,994,929 B2 | 3/2015 | Lupton et al. | |
| 9,003,888 B2 | 4/2015 | Lopez et al. | |
| 9,074,462 B2 | 7/2015 | Pearce | |
| 9,080,949 B2 | 7/2015 | Mestayer et al. | |
| 9,109,944 B2 | 8/2015 | Den Boer et al. | |
| 9,140,582 B2 | 9/2015 | Farhadiroushan et al. | |
| 9,140,815 B2 | 9/2015 | Lopez et al. | |
| 9,170,149 B2 | 10/2015 | Hartog et al. | |
| 9,234,972 B2 | 1/2016 | Lupton et al. | |
| 9,234,999 B2 | 1/2016 | Koelman et al. | |
| 9,250,112 B2 | 2/2016 | Godfrey | |
| 2001/0023614 A1 | 9/2001 | Tubel et al. | |
| 2004/0262013 A1 | 12/2004 | Tilton et al. | |
| 2005/0024231 A1 | 2/2005 | Fincher et al. | |
| 2008/0142212 A1 | 6/2008 | Hartog et al. | |
| 2008/0272931 A1 | 11/2008 | Auzerais | |
| 2010/0092145 A1 * | 4/2010 | Read | G02B 6/4248 385/134 |
| 2010/0200743 A1 | 8/2010 | Forster et al. | |
| 2011/0069302 A1 | 3/2011 | Hill et al. | |
| 2011/0088462 A1 | 4/2011 | Samson et al. | |
| 2012/0013893 A1 * | 1/2012 | Maida | E21B 47/123 356/73.1 |
| 2012/0057432 A1 | 3/2012 | Hill et al. | |
| 2012/0060615 A1 | 3/2012 | Farhadiroushan et al. | |
| 2012/0063267 A1 | 3/2012 | Hill et al. | |
| 2012/0175135 A1 | 6/2012 | Dyer et al. | |
| 2012/0226452 A1 | 9/2012 | Hill et al. | |
| 2012/0257475 A1 | 10/2012 | Luscombe | |
| 2012/0278043 A1 | 11/2012 | Lewis et al. | |
| 2012/0280117 A1 | 11/2012 | Lewis et al. | |
| 2013/0021874 A1 | 1/2013 | Hartog et al. | |
| 2013/0091942 A1 | 4/2013 | Samson et al. | |
| 2013/0242698 A1 | 9/2013 | McEwen-King et al. | |
| 2013/0291643 A1 | 11/2013 | Lumens | |
| 2014/0034301 A1 | 2/2014 | Leblanc | |
| 2014/0036628 A1 | 2/2014 | Hill et al. | |
| 2014/0092710 A1 | 4/2014 | Farhadiroushan et al. | |
| 2014/0126325 A1 | 5/2014 | Farhadiroushan et al. | |
| 2014/0150547 A1 | 6/2014 | Chau et al. | |
| 2014/0163889 A1 | 6/2014 | Finfer et al. | |
| 2014/0231636 A1 | 8/2014 | Goldner et al. | |
| 2014/0285875 A1 | 9/2014 | Jaaskelainen et al. | |
| 2014/0347957 A1 | 11/2014 | Hartog et al. | |
| 2015/0076334 A1 | 3/2015 | Kragh et al. | |
| 2015/0192436 A1 | 7/2015 | Farhadiroushan et al. | |
| 2015/0285064 A1 | 10/2015 | Farhadiroushan et al. | |
| 2015/0337653 A1 | 11/2015 | Hill et al. | |
| 2015/0346370 A1 | 12/2015 | Martin et al. | |
| 2016/0003648 A1 | 1/2016 | Barfoot et al. | |

FOREIGN PATENT DOCUMENTS

| | | |
|---|---|---|
| EP | 2010136810 | 12/2010 |
| EP | 2011010110 | 1/2011 |
| EP | 2011039501 | 4/2011 |
| EP | 2011047261 | 4/2011 |
| EP | 2011048373 | 4/2011 |
| EP | 2686709 | 9/2012 |
| EP | 2718682 | 4/2014 |
| EP | 2925962 | 6/2014 |
| EP | 2976503 | 9/2014 |
| EP | 2205999 | 3/2016 |
| GB | 2393465 | 3/2004 |
| GB | 2398805 | 9/2004 |
| WO | 0163804 | 8/2001 |
| WO | 2009056855 | 7/2009 |
| WO | 2011058313 | 5/2011 |
| WO | 2012030814 | 3/2012 |
| WO | 2012084997 | 6/2012 |
| WO | 2012087603 | 6/2012 |
| WO | 2012114067 | 8/2012 |
| WO | 2012123760 | 9/2012 |
| WO | 2012137021 | 10/2012 |
| WO | 2012137022 | 10/2012 |
| WO | 2012168679 | 12/2012 |
| WO | 2013008035 | 1/2013 |
| WO | 2013045882 | 4/2013 |
| WO | 2014085012 | 5/2014 |
| WO | 2014149227 | 9/2014 |

OTHER PUBLICATIONS

Australian Search Report for Application No. 2014388379 dated Apr. 19, 2017.
Supplementary European Search Report for Application No. EP 14887297 dated Jul. 17, 2017.
EPO Examination Report for Application No. 14887297.1 dated Mar. 12, 2018.

* cited by examiner

WELL TOOLS WITH VIBRATORY TELEMETRY TO OPTICAL LINE THEREIN

TECHNICAL FIELD

This disclosure relates generally to equipment utilized and operations performed in conjunction with a subterranean well and, in one example described below, more particularly provides a well tool that transmits vibratory signals to an optical line therein.

BACKGROUND

Well tools (such as logging tools, formation testing tools, production monitoring tools, etc.) can include sensors for measuring various parameters in wells. It is advantageous to be able to transmit such parameter measurements to a surface location for storage, processing, etc. Although an optical line could be used for transmitting the parameter measurements from a downhole location to the surface location, wellsite facilities are typically not ideal places to make optical connections and, if multiple well tools are to be optically connected to the optical line, difficulties and chances for mishaps are multiplied.

DETAILED DESCRIPTION

Figure 1:
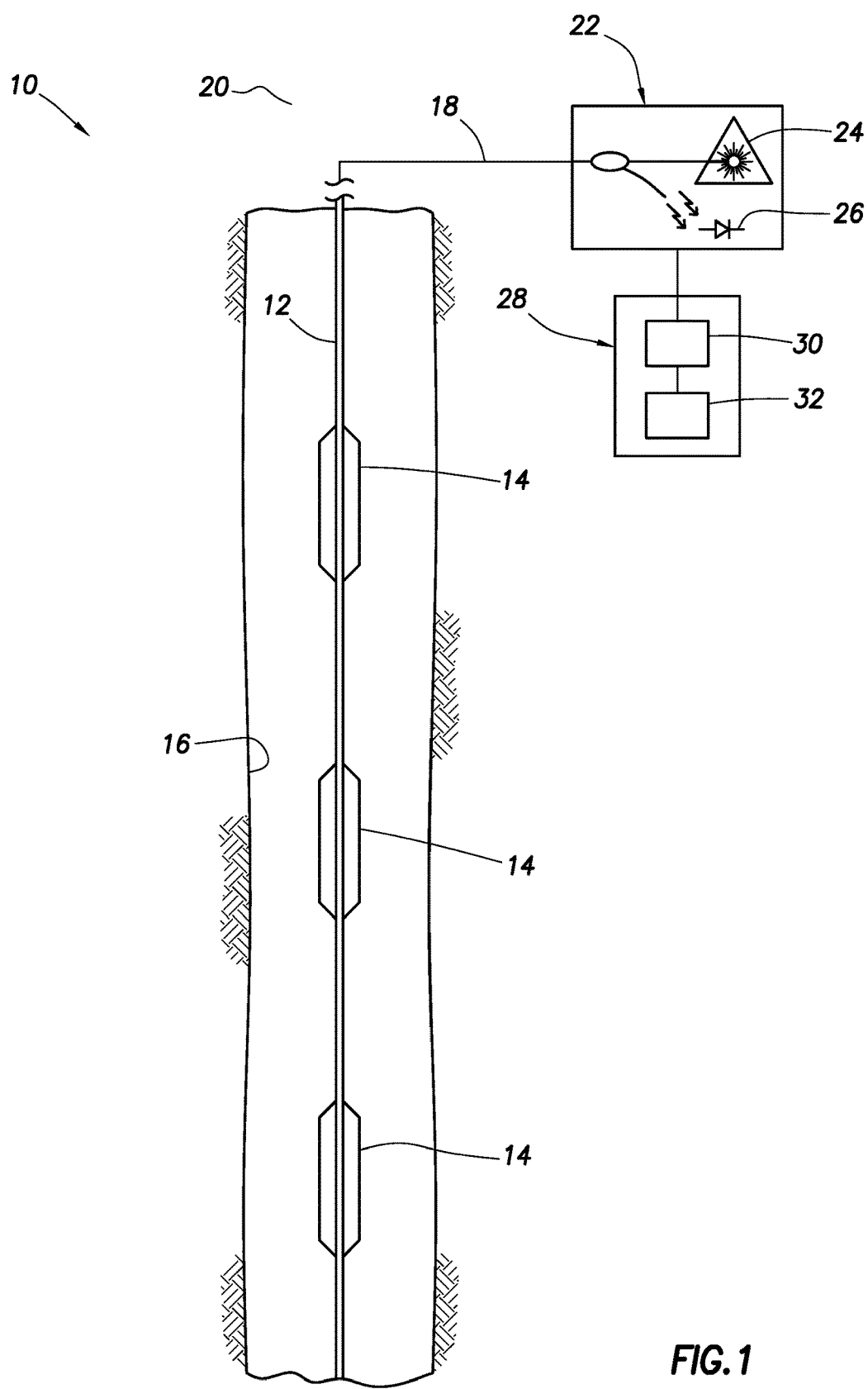
FIG. 1 is a representative partially cross-sectional view of a well system and associated method which can embody principles of this disclosure.

Representatively illustrated in FIG. 1 is a system 10 for use with a well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, an optical line 12 is used to convey one or more well tools 14 into and through a wellbore 16. The wellbore 16 is depicted in FIG. 1 as being uncased or open hole, but in other examples all or part of the wellbore may be cased, completed, etc. Thus, the optical line 12, with the well tools 14 thereon, can be disposed in casing, tubing, liner or other structures or equipment in the wellbore 16.

The optical line 12 includes at least one optical waveguide 18 therein. The line 12 may be in the form of a cable, wireline, slickline, coiled tubing, control line or other type of line that is capable of conveying at least one well tool 14 in the wellbore 16.

In addition to the optical waveguide 18, the line 12 can include any number or combination of electrical conductors and/or hydraulic conduits, shielding, armor, strength members, etc. Thus, the scope of this disclosure is not limited to any particular configuration or structure of the line 12.

The optical waveguide 18 can be a single mode, multi-mode, polarization maintaining or other type of optical waveguide. The optical waveguide 18 may comprise fiber Bragg gratings (FBG's), intrinsic or extrinsic Fabry-Perot interferometers, or any alteration of, or perturbation to, its refractive index along its length. The optical waveguide 18 may be in the form of an optical fiber, an optical ribbon or other waveguide form. Thus, the scope of this disclosure is not limited to use of any particular type of optical waveguide.

At a surface location 20 (such as, a wellsite location on land or water), any of a variety of different techniques may be used for displacing the line 12, with the well tools 14 secured thereto, into, through and out of the wellbore 16. For example, a wireline or slickline rig (not shown) of the type well known to those skilled in the art, with associated spool, sheaves, lubricator, etc., may be used if the line 12 is in the form of a cable, wireline or slickline. Desirably, the wireline or slickline rig would be equipped with a rotary optical coupling for optically connecting to the waveguide 18.

As another example, a coiled tubing rig (not shown) of the type well known to those skilled in the art, with associated spool and injector, etc., may be used if the line 12 is in the form of coiled tubing. Again, the coiled tubing rig would desirably be equipped with a rotary optical coupling for optically connecting to the waveguide 18. Thus, it will be appreciated that the scope of this disclosure is not limited to any particular means for displacing the line 12 and well tools 14 in the wellbore 16.

In the FIG. 1 example, the optical waveguide 18 is optically connected to an optical interrogator 22 at the surface location 20. The optical interrogator 22 is depicted schematically in FIG. 1 as including an optical source 24 (such as, a laser or a light emitting diode) and an optical detector 26 (such as, an opto-electric converter or photodiode).

The optical source 24 launches light (electromagnetic energy) into the waveguide 18, and light returned to the interrogator 22 is detected by the detector 26. Note that it is not necessary for the light to be launched into a same end of the optical waveguide 18 as an end via which light is returned to the interrogator 22.

Other or different equipment (such as, an interferometer or an optical time domain or frequency domain reflectometer) may be included in the interrogator 22 in some examples. The scope of this disclosure is not limited to use of any particular type or construction of optical interrogator.

A computer 28 is used to control operation of the interrogator 22, and to record optical measurements made by the interrogator. In this example, the computer 28 includes at least a processor 30 and memory 32. The processor 30 operates the optical source 24, receives measurement data from the detector 26 and manipulates that data. The memory 32 stores instructions for operation of the processor 30, and stores processed measurement data. The processor 30 and memory 32 can perform additional or different functions in keeping with the scope of this disclosure.

In other examples, different types of computers may be used, the computer 28 could include other equipment (such as, input and output devices, etc.). The computer 28 could be integrated with the interrogator 22 into a single instrument. Thus, the scope of this disclosure is not limited to use of any particular type or construction of computer.

The optical waveguide 18, interrogator 22 and computer 28 may comprise a distributed acoustic sensing (DAS) or distributed vibration sensing (DVS) system capable of detecting acoustic or other vibratory energy as distributed along the optical waveguide. For example, the interrogator 22 could be used to measure Brillouin or coherent Rayleigh scattering in the optical waveguide 18 as an indication of acoustic or other vibratory energy as distributed along the waveguide.

In addition, a ratio of Stokes and anti-Stokes components of Raman scattering in the optical waveguide 18 could be monitored as an indication of temperature as distributed along the waveguide. In other examples, Brillouin scattering may be detected as an indication of temperature as distributed along the optical waveguide 18.

In further examples, fiber Bragg gratings (not shown) could be closely spaced apart along the optical waveguide 18 (at least in locations where the well tools 14 are secured to the line), so that vibration of the waveguide will result in changes in light reflected back to the interrogator 22. An interferometer (not shown) may be used to detect such changes in the reflected light.

In the FIG. 1 example, each of the well tools 14 is secured to the line 12, so that the line can be used to convey the well tools in the wellbore 16, and so that the line can be used to communicate sensor data from the well tools to the surface location 20. Although the well tools 14 are depicted in FIG. 1 as having the line 12 extending completely through each of them, a well tool could be secured at a distal end of the line. Thus, the scope of this disclosure is not limited to any particular placement of the well tool(s) 14 along the line 12.

Figure 2:
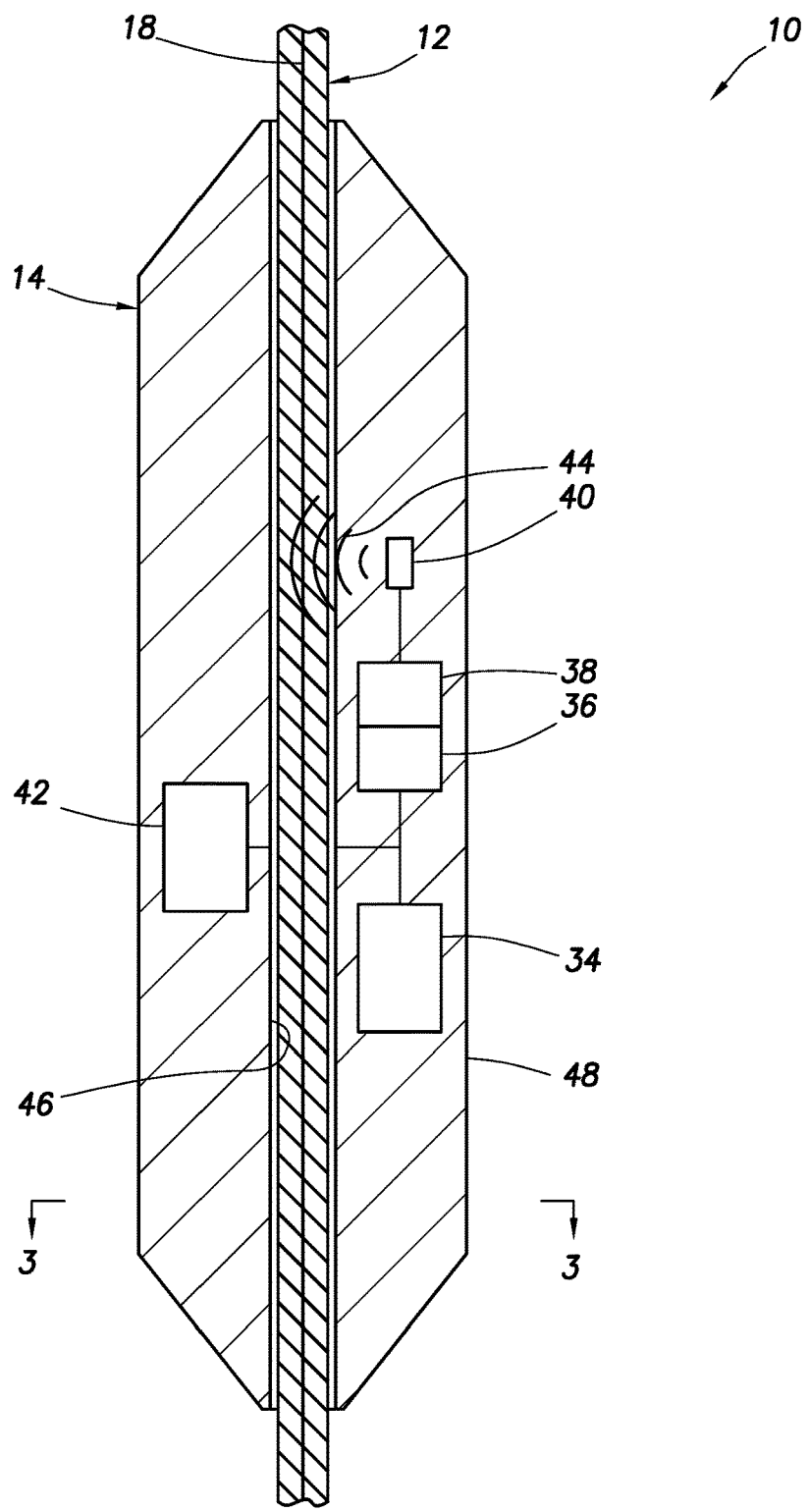
FIG. 2 is a representative enlarged scale cross-sectional view of a well tool that may be used in the system and method of FIG. 1, and which can embody the principles of this disclosure.

Referring additionally now to FIG. 2, an enlarged scale view of an example of one of the well tools 14 is representatively illustrated, with the line 12 extending longitudinally through the well tool. If the well tool 14 is secured at a distal end of the line 12, the line may extend into the well tool, but not completely through the well tool.

In the FIG. 2 example, the well tool 14 includes at least one sensor 34, memory 36, a processor 38, a vibratory transmitter 40 and an electrical power source 42. Additional, fewer or different components may be included in the well tool 14 in keeping with the scope of this disclosure.

The sensor 34 measures one or more parameters (such as, temperature, pressure, resistivity, pH, chemical type, gas content, oil/water ratio, density, viscosity, flow rate, etc.). Any type or types of sensors may be used in the well tool 14. Thus, the scope of this disclosure is not limited to measurement of any particular parameter by the sensor 34.

The memory 36 stores instructions for operation of the processor 38, and also stores the parameter measurements made by the sensor 34. The processor 38 controls operation of the vibratory transmitter 40 and processes the parameter measurements, so that they are modulated appropriately on vibratory signals 44 produced by the transmitter.

The vibratory transmitter 40 may be any type of transmitter capable of transmitting the acoustic or other vibratory signals 44 to the optical waveguide 18 in the line 12. For example, the transmitter 40 could comprise a piezoelectric actuator, a magnetostrictive actuator, a voice coil or any other device capable of producing vibrations detectable using the optical waveguide 18. Thus, the scope of this disclosure is not limited to use of any particular type of vibratory transmitter.

The power source 42 supplies electrical power to the sensor 34, memory 36, processor 38 and/or transmitter 40. The power source 42 may comprise one or more batteries or other type of electrical storage devices and/or an electrical generator. If the line 12 includes one or more electrical conductors, then the line could serve as the power source 42. Thus, the scope of this disclosure is not limited to use of any particular type of power source.

Note that the transmitter 40 transmits the signals 44 inwardly toward an inner passage 46 extending in an outer housing 48 of the well tool 14, and in which the line 12 extends. In this manner, the signals 44 can be used to telemeter the parameter measurements (as well as any other data, such as, tool identification, handshake information, time stamps, etc.) to the optical waveguide 18 in the line 12, without a need to make any optical connection between the well tool 14 and the waveguide.

Simultaneous (or non-simultaneous) vibratory signals 44 from multiple well tools 14 along the line 12 can be detected by the interrogator 22 (see FIG. 1), without a need for multiple optical connections between the optical waveguide 18 and the well tools. Since the distributed acoustic or distributed vibration sensing (DAS or DVS) system can determine a location along the optical waveguide 18 at which vibrational energy is imparted to the waveguide, the location in the wellbore 16 of each transmitting well tool 14 can be immediately known, even if the well tools are currently being displaced through the wellbore.

In order to effectively couple the vibratory signals 44 from the well tool 14 to the waveguide 18, and to provide for conveying the well tool in the wellbore 16 using the line 12, the well tool is preferably secured directly to the line. Devices such as clamps, wedges, friction enhancers, adhesives or any other means of securing the well tool 14 to the line 12 may be used, in keeping with the principles of this disclosure.

Figure 3A:
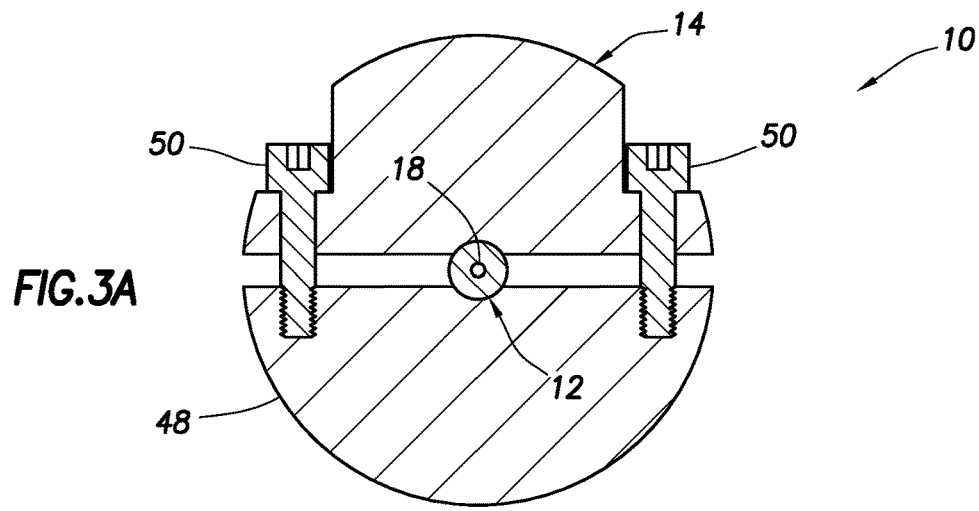
FIGS. 3A-C are representative cross-sectional views of the well tool, taken along line 3-3 of FIG. 2, depicting example techniques for securing an optical line in the well tool.
Figure 3B:
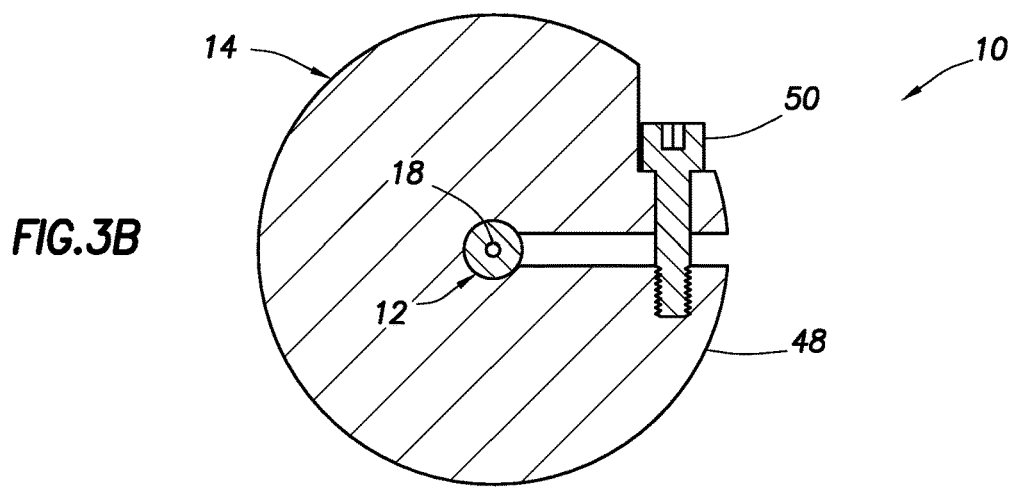
Figure 3C:
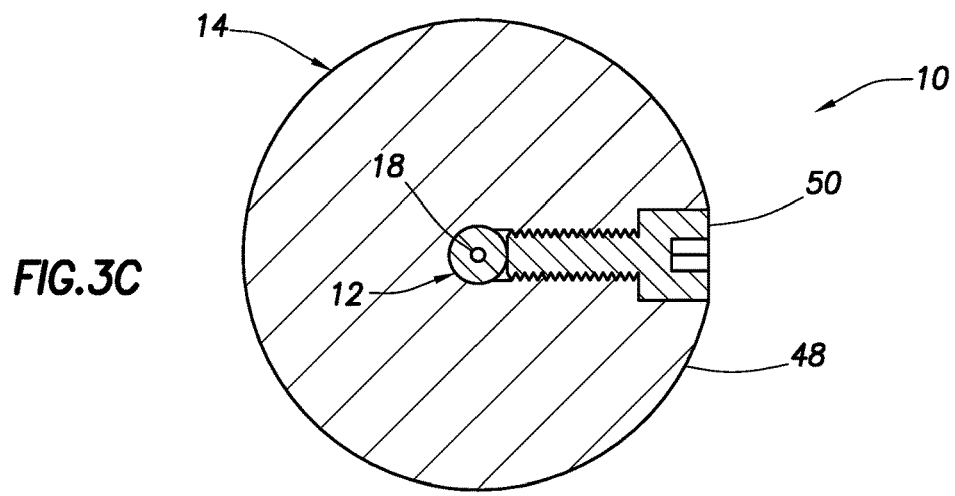

Referring additionally now to FIGS. 3A-C, three example techniques for securing the well tool 14 to the line 12 are representatively illustrated in cross-section, taken along line 3-3 of FIG. 2. Of course, other techniques for securing the well tool 14 to the line 12 may be used in keeping with the principles of this disclosure.

In the FIG. 3A example, the outer housing 48 is laterally split into two sections. Threaded fasteners 50 (e.g., screws or bolts) are used to clamp the housing sections onto the line 12 positioned between the housing sections.

In the FIG. 3B example, the housing 48 is split only partially laterally. One or more fasteners 50 are used to compress the housing 48 about the line 12 therein.

In the FIG. 3C example, the fastener 50 itself is used to press against the line 12 in the housing 48. The fastener 50, thus, grips the line 12 in the housing 48. In this example, it may be advantageous to position the transmitter 40 in close proximity to, or opposite the line 12 from, the fastener 50 for best acoustic or other vibratory coupling between the well tool 14 and the line.

It may now be fully appreciated that the above disclosure provides significant advances to the art of constructing well tools and telemetering data from well tools. In examples described above, the well tool 14 can telemeter sensor data to the line 12 for transmission to the surface location 20, without a need to form an optical connection between the well tool and an optical waveguide 18 of the line. Furthermore, multiple well tools 14 can telemeter data to the line 12, without any of the well tools being optically connected to the waveguide 18.

The above disclosure provides to the art a well tool 14. In one example, the well tool can comprise an outer housing 48 and a vibratory transmitter 40 disposed in the outer housing 48. The vibratory transmitter 40 transmits a vibratory signal 44 to an optical line 12 disposed in the outer housing 48.

The optical line 12 may also convey the well tool 14 through a wellbore 16.

The optical line 12 may be clamped in the outer housing 48.

The vibratory signal 44 can comprise parameter measurements made by a sensor 34 of the well tool 14.

The optical line 12 may extend to a surface location 20 or to another remote location.

The optical line 12 may extend completely or only partially through the well tool 14.

The vibratory transmitter 40 may transmit the vibratory signal 44 inward toward an inner passage 46 of the well tool 14.

The well tool 14 can free of any optical connection to the optical line 12.

A well system 10 is also provided to the art by the above disclosure. In one example, the well system 10 can, comprise an optical line 12 extending in a wellbore 16, and at least one well tool 14 secured to the optical line 12. The well tool 14 can include a vibratory transmitter 40 which transmits a vibratory signal 44 to the optical line 12. The optical line 12 conveys the well tool 14 into the wellbore 16.

The well tool 14 may be clamped to the optical line 12.

Multiple well tools 14 can be secured to the optical line 12. The well tools 14 may be spaced apart along the optical line 12, and each of the well tools 14 can be free of any optical connection to the optical line 12.

A method of telemetering data from a well tool 14 to an optical line 12 is also described above. In one example, the method comprises: securing the well tool 14 to the optical line 12 without optically connecting the well tool 14 to the optical line 12; and conveying the well tool 14 in a wellbore 16 on the optical line 12.

The well tool 14 can include a vibratory transmitter 40 that transmits the data via a vibratory signal 44 to the optical line 12. The vibratory transmitter 40 may transmit the vibratory signal 44 inward toward an inner passage 46 in the well tool 14, the optical line 12 being disposed in the inner passage 46.

The securing step can include securing multiple ones of the well tool 14 to the optical line 12.

The securing step can include extending the optical line 12 completely through the well tool 14.

The conveying step may be performed while the data is telemetered from the well tool 14 to the optical line 12.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A well tool, comprising:
    an outer housing comprising an inner surface, an outer surface, and an inner passage, wherein the inner passage extends through the inner surface of the outer housing, wherein an optical line is disposed within the inner passage;
    a vibratory transmitter embedded within the outer housing between the inner surface of the outer housing and the outer surface of the outer housing, and wherein the vibratory transmitter transmits a vibratory signal to the optical line.

2. The well tool of claim 1, wherein the optical line conveys the well tool through a wellbore.

3. The well tool of claim 1, wherein the optical line is clamped in the outer housing.

4. The well tool of claim 1, wherein the vibratory signal comprises parameter measurements made by a sensor of the well tool.

5. The well tool of claim 1, wherein the optical line extends to a surface location.

6. The well tool of claim 1, wherein the optical line extends completely through the well tool.

7. The well tool of claim 1, wherein the vibratory transmitter transmits the vibratory signal inward toward the inner passage of the well tool.

8. The well tool of claim 1, wherein the well tool is free of any optical connection to the optical line.

9. A well system, comprising:
    an optical line extending in a wellbore; and
    at least one well tool comprising an outer housing, wherein the outer housing comprises an inner surface and an outer surface, wherein the at least one well tool is secured to the optical line, wherein the optical line extends through the at least one well tool through an inner passage, wherein the inner passage extends through the inner surface of the outer housing, and including a vibratory transmitter, wherein the vibratory transmitter is embedded within the outer housing between the inner surface of the outer housing and the outer surface of the outer housing, which transmits a vibratory signal to the optical line, wherein the optical line conveys the well tool into the wellbore.

10. The well system of claim 9, wherein the vibratory transmitter transmits the vibratory signal inward toward the inner passage in the well tool, the optical line being disposed in the inner passage.

11. The well system of claim 9, wherein multiple ones of the well tool are secured to the optical line.

12. The well system of claim 11, wherein the well tools are spaced apart along the optical line, and wherein each of the well tools is free of any optical connection to the optical line.

13. The well system of claim 9, wherein the vibratory signal comprises parameter measurements made by a sensor of the well tool.

14. The well system of claim 9, wherein the optical line extends completely through the well tool.

15. A method of telemetering data from a well tool to an optical line, the method comprising:

securing the well tool to the optical line through an inner passage within an outer housing without optically connecting the well tool to the optical line, wherein the outer housing comprises an inner surface and an outer surface, wherein the inner passage extends through the inner surface of the outer housing, wherein a vibratory transmitter is embedded within the outer housing between the inner surface of the outer housing and the outer surface of the outer housing; and conveying the well tool in a wellbore on the optical line.

16. The method of claim 15, wherein the vibratory transmitter transmits the data via a vibratory signal to the optical line.

17. The method of claim 16, wherein the vibratory transmitter transmits the vibratory signal inward toward the inner passage in the well tool, the optical line being disposed in the inner passage.

18. The method of claim 15, wherein the data comprises parameter measurements made by a sensor of the well tool.

19. The method of claim 15, wherein the securing further comprises securing multiple ones of the well tool to the optical line.

20. The method of claim 15, wherein the securing comprises extending the optical line completely through the well tool.

* * * * *